United States Patent [19]

Smith

[11] 4,427,797

[45] Jan. 24, 1984

[54] NON-BURNING, NON-SMOKING THERMOSET FOAM COMPOSITION

[75] Inventor: Stuart B. Smith, Conyers, Ga.

[73] Assignee: Thermocell Development Ltd., Knoxville, Tenn.

[21] Appl. No.: 371,983

[22] Filed: Apr. 26, 1982

Related U.S. Application Data

[63] Continuation-in-part of Ser. No. 272,008, Jun. 9, 1981, abandoned.

[51] Int. Cl.³ .................. C08G 18/14; C08G 18/32
[52] U.S. Cl. ............................ 521/166; 521/128; 521/137; 521/163; 521/903
[58] Field of Search ............ 521/131, 128, 137, 166, 521/903, 163

[56] References Cited

U.S. PATENT DOCUMENTS 3,485,797  12/1969  Robins ...................... 526/71
3,928,258  12/1975  Alexander ................. 521/131
4,108,791  8/1978   Wasilczyk .................. 252/182
4,221,875  9/1980   Yukuta et al. ............. 521/128

OTHER PUBLICATIONS

Draka Foam Limited–Data Sheet on "Drakaflex", High Resilience Foam–Jun. 1980, (Glossop, Derbyshire, England).

*Primary Examiner*—H. S. Cockeram

[57] ABSTRACT

A foam composition obtained by first forming a pre-blend reaction product by reacting about 200 to about 250 parts by weight melamine with about 20 to about 100 parts by weight phenolic resin having benzylic ether linkages in the presence of a catalyst and further reacting said pre-blend reaction product with about 20 to about 100 parts by weight isocyanate and about 20 parts by weight polyethylene glycol. Such foams are essentially non-burning under fire conditions and exhibit excellent compression strength characteristics while being virtually non-firable.

10 Claims, No Drawings

NON-BURNING, NON-SMOKING THERMOSET FOAM COMPOSITION

This application is a continuation-in-part application of application having Ser. No. 272,008, filed June 9, 1981, now abandoned, the disclosure of which is hereby incorporated by reference.

BACKGROUND OF THE INVENTION

This invention relates to non-burning foams that do not smoke when exposed to fire.

In the past, various additives have been included in polymer compositions to impart flame resistance and to reduce smoke emissions under conditions of fire. Such known additives include antimony trioxide and stannic oxide in ABS/PVC polymer blends.

Conventional fire-resistant polyurethanes contain phosphorous and/or halogen-containing compounds as additives. These additives are very expensive and corrosive. Other known additives include organic amine-metal complexes, such as alkoxymethylmelamine.

Other known compositions include rigid polyurethane foams to which melamine powder has been added in an effort to impart flame resistance while reducing smoke emission. In these known polyurethane foams, the melamine is believed to act merely as a filler-like material. However, it has been observed that these melamine-containing polyurethane foams suffer from several drawbacks. They exhibit, for instance, unsatisfactory flame resistance and smoke emission characteristics when exposed to fire. Additionally, when these foams contain large amounts of melamine, for instance, equal amounts by weight of the melamine filler and polyol component, these foams exhibit only limited flame resistance properties at the expense of useful processing, mechanical and other commercially attractive properties.

Conventional foams prepared from benyzlic ether-linked phenolic resins and isocyanates also suffer from several drawbacks. For example, it has been observed that such foams have moderate to extreme friability and only slight frame resistance. Additionally, such foams tend to emit free formaldehyde even after full curing. This poses health hazards and presents difficulty in complying with health regulations. The formaldehyde emission problem has added another roadblock to the effective commercialization of these foams.

Attempts to overcome these drawbacks include the use of a combination of basic tertiary amine catalysts in small amounts with certain specific and preferred blowing agents such as dichlorodifluoromethane and chloromethane. Such attempts have been limited in application to tertiary amine catalysts and certain preferred blowing agents, but have not met with any success. Such foams are not a commercially useful product.

According to the present invention, a three-dimensional cross-linked foamed reaction product of melamine, a di- or polyisocyanate and an ether-linked phenolic resin overcomes these drawbacks. Such a foamed product, a thermoset resin, is prepared in an anhydrous foaming process. The advantages of the foam of this invention are not dependent on the use of any particular blowing agent but are somewhat dependent on the particular catalyst system used. The resulting foam product is non-burning and essentially non-smoking under fire conditions and exhibits, for example, excellent compressive strength characteristics while being virtually non-friable.

SUMMARY AND DESCRIPTION OF THE INVENTION

The present invention relates to non-shrinking, non-burning, non-smoking thermoset foams that are suitable, for example, as insulating materials, padding materials, structural materials, flotation materials and automobile parts. The various end uses can be further selected depending on the type of polyisocyanate or resin employed.

Rigid foams having excellent properties have been obtained by reacting approximately stoichiometric quantities of phenolic resins having benzylic ether linkages with a polyisocyanate and about 2 parts by weight melamine. Commercially available phenolic resins having benzylic ether linkages typically contain significant amounts of free formaldehyde and free phenol. The melamine reacts rapidly with the free formaldehyde and to a lesser extent with the phenol. The melamine in excess of the reacted free formaldehyde and phenol functions as a flame retardant. At least 125 parts by weight of melamine exceeding the amount required to react with the formaldehyde and phenol is needed to obtain a non-burning foam, with about 200 to about 250 total parts by weight excess melamine being preferred.

The amounts of isocyanate and phenolic resin employed in preparing a foam according to the present invention are approximately in about a stoichiometric ratio. The amounts of isocyanate employed may be slightly less than a precise stoichiometric amount to account for partial reactions of the phenolic resin related to the formation of the phenol-aldehyde-melamine-formaldehyde complex. For example, a suitable amount of MDI per 100 parts by weight phenolic resin employed can be determined as follows: amount MDI used $= 0.237$ (hydroxyl number for the phenolic resin). For a typical TDI, the calculation is essentially the same except the coefficient is about 0.29.

Without intending to be limited thereby, it is believed that the final product is a fully cross-linked thermoset foam. The melamine is not a filler material but actually is part of the final cross-linked product.

For example, a phenolic resin having benzylic ether linkages and containing about 2% to about 15% of a free aldehyde and about 10% to about 20% free phenol, can be mixed with either coarse or fine melamine powder in the presence of an organotin catalyst to form a first pre-blend resistant to hydrolysis. Typically, the catalyst will be a pale yellow liquid having a freezing point of $-10°$ C., a refractive index at 25° C. of 1.50, a flash point (COC) of 185° C. and a specific gravity at 25° C. of about 1.03.

A catalyst fulfilling the requirements is marketed by Witco Chemicals under the tradename UL-22.

Thereafter, the amine groups on the melamine ring react with the formaldehyde to form a melamine-formaldehyde complex. At the same time a similar reaction occurs between the available hydroxy groups on the free phenol to form a phenol-formaldehyde complex. The phenol-formaldehyde complex and melamine-formaldehyde complexes, similar to space network polymers, can cross-link through formaldehyde linkages. Available phenolic end groups on the phenolic resin may react with the formaldehyde as well.

A second pre-blend is produced from the isocyanate and remaining foam reactants or components.

The subsequent addition of this isocyanate-containing second pre-blend to the said first pre-blend initiates a reaction between the NC=O groups and the unreacted hydroxyl groups on the phenol-formaldehyde-melamine-formaldehyde complex. In addition, the isocyanate reacts with any free hydroxyl groups on the phenol resin itself. Secondary reactions can also occur.

The amount of free aldehyde and free phenol utilized can be varied. If desired, formaldehyde can be added. Care must be employed if formaldehyde is added since if excess formaldehyde is added then emission problems commonly associated with urea-formaldehyde products could occur. However, to avoid formaldehyde emission problems, the amounts of free formaldehyde added must be less than the available amine groups of the melamine or the hydroxy groups of the phenolic resin. The phenolic resin-phenol-melamine-formaldehyde complex must still have sufficient OH groups to react with the isocyanate.

The phenols employed in the resin can be meta-substituted. In general, if an aldehyde is added then relatively low molecular weight substantially anhydrous aldehydes are preferred, such as formaldehyde.

For example, a useful foam composition can be obtained by reacting a first pre-blend containing about 200 to about 250 parts by weight melamine and about 100 parts by weight phenolic resin having benzylic ether linkages with a second pre-blend containing about 100 parts by weight of a urethane type isocyanate and an effective amount of a blowing agent, in the presence of a urethane catalyst. The total amounts of phenolic resin and isocyanate may, of course, be greater than 100 parts by weight. The quantities of the other materials, if desired, may be adjusted accordingly. Friability is controlled or eliminated by adding a friability modifier to the reaction mix via one or both of the pre-blends, for instance about 10 parts polyethylene glycol can be added. Advantageously 10 to 20 parts polyethylene glycol can be employed.

An effective amount of a non-aqueous blowing agent may vary depending on the foam end use. Various halogenated blowing agents can be used in the present invention. For example, 15 to 50 parts by weight of Freon-11 or Freon-11B can be advantageously employed. Foam density may depend in part on the amounts of blowing agents employed.

Other chemical reactants having free unhindered functional groups, such as hydroxy groups, may be employed. In addition, other reactants capable of optionally having ether linkages capable of producing a crosslinked foam product can also be advantageously employed in the present invention instead of, or in combination with, a phenolic resin having benzylic ether linkages. For instance, novolac resins can be substituted for or used in combination with the phenolic resin having benzylic ether linkages. Resole resins can also be employed, the amounts used are generally about the same as the quantity of phenolic resin being replaced. Various suitable resins are described in U.S. Pat. No. 3,485,797, the disclosure of which is hereby incorporated by reference.

Various known isocyanates having a plurality of available reactive NC=O groups can be employed in the present invention. For instance, aromatic diisocyanates such as TDI (tolylene diisocyanate), or other isocyanates generally described as aliphatic diisocyanates, diphenylmethane diisocyanates, and acrylic diisocyanates can be used in the present invention.

Combinations of catalysts yield acceptable results and are preferred. For example, a combination of an organotin catalyst and organic acid salts of metals from Group I of the Periodic Table can be used to prepare rigid foam products having excellent physical properties. Preferably an organotin catalyst, such as stannous octoate, is used in combination with potassium octoate. For example, an organotin catalyst, sold by Witco Chemicals with the UL-22 product designation can be used since this type of catalyst does not lose catalytic activity as rapidly as, for instance, dibutyltin dilaurate (DBTDL). DBTDL can be used but is not preferred. Also a catalyst containing 1.5 parts by weight of UL-22 and 0.5 parts by weight of potassium octoate, can be substituted for the Air Products trimerization catalyst TMR-2. Other weight ratios of organotin catalysts and organic acid salts can be employed, such as for instance, 2.0 parts by weight UL-22 and 0.5 parts by weight potassium octoate.

Trimerization catalysts, such as TMR-2 from Air Products Corporation, can be used. However, the foams produced with trimerization catalysts have, for example, less compressive strength than foams produced with a combination of organotin and potassium octoate catalysts and are not preferred.

The catalyst employed can vary between about 0.1% to 5% by weight of the other reagents and chemicals used in preparing the foam. Preferably the amounts employed range between about 0.1% to about 3% by weight of the other materials employed.

The process for preparing the rigid foam of this invention is essentially anhydrous. Adding water during the foam preparation may, for example, significantly decrease the number, on a percent basis, of the closed air cells in the final product and produce other undesired effects on the final foam products. Water or aqueous blowing agents produce the formation of numerous and undesired pinholes in the foam cells as determined in electron microscopy studies. Other undesired effects include, for example, immediate reaction of the NC=O groups of the isocyanate foam component with the water.

Failure to include a melamine reactant leads to difficulties. Without at least about 2 to 25 parts by weight melamine the free formaldehyde present in the phenolic resin will remain unreacted. This unreacted formaldehyde is emitted as a vapor during processing and may prevent the use of phenol-formaldehyde based phenolic resins from being used in the manufacture of useful foam products. In addition, failure to include enough melamine to sufficiently react with at least the free formaldehyde and phenol in the resin results in a product which can suffer about 15% to about 20% weight loss due to friability.

Reacting melamine with a phenolic resin containing benzylic ether linkages containing free aldehyde and free phenol and then reacting such a reaction mix with an isocyanate, such as methylene diphenyl isocyanate (MDI), in the presence of an effective amount of a blowing agent, surfactant and catalyst produces a closed cell foam. However, the resulting foam can still have a friable surface. If small amounts of glycol, such as, for instance, polyethylene glycol, are added, then the friability is significantly reduced. About 20 parts by weight glycol per 100 parts by weight isocyanate is preferred. Greater or lesser amounts may be used if desired.

The addition of a friability control agent has other benefits as well. Since the phenolic resin itself can be relatively viscous, i.e., up to about 10,000 to 30,000 cps, the addition of a glycol, such as, for example, polyethylene glycol, in an amount equivalent to about 20% by weight of the phenolic resin, significantly reduces the viscosity and thereby reduces processing costs. Other glycols can be used.

In the absence of a polyethylene glycol friability modifier the foam may suffer a weight loss from about 10% to about 15% because of friability.

Other friability or viscosity modifiers can also be advantageously employed. For example, a high boiling point chlorinated solvent, such as perchloroethylene, in amounts between 5 to 35 parts by weight of the resin may essentially eliminate friability problems. About 15 to about 25 parts by weight perchloroethylene are preferred. The use of such a modifier also reduces the viscosity to a suitable degree. Suitable processing viscosities range from about 10,000 to about 30,000 cps.

More specifically, the results obtained using perchloroethylene were unexpected. Other conventional chlorinated materials, such as, for example, trichloroethylene, and trimethylene chloride produced foams with friability problems. The foams produced using such conventional materials were distorted and had physical properties which were inferior to foams using perchloroethylene.

Advantageously, small quantities of a branched polyester may replace other friability modifiers or agents such as, for example, polyethylene glycol or perchloroethylene. Foams having such branched polyester friability modifiers have only about a 0.5% to about 1% weight loss due to friability. Branched polyester friability modifiers also provide additional advantages.

Various polyester friability modifiers may be employed. For example, a suitable hydroxyl terminated saturated polyester may be described as a hygroscopic branched glycol adipate, having a hydroxyl number of about 52, an acid number of about 1.2, only about 0.05% water, and viscosity at 25° C. of 23,000 cps. The polyester modifiers may, of course, have various molecular weights. Suitable saturated hydroxyl terminated linear polyesters can have molecular weights ranging from about 3,000 to about 500. Preferably the molecular weights range between about 2,500 and about 1,000. Correspondingly the hydroxyl number of such linear polyesters can vary from about 36 to about 225 with about 45 to about 56 being preferred. Viscosities of such linear polyesters decrease with molecular weight from about 19,000 to about 500 cps at 25° C. with about 6,000 to about 15,000 cps being preferred.

For instance, substituting an equivalent amount of a branched polyester or a derivative thereof for the perchloroethylene used in preparing the melamine-modified foam, results in essentially a non-burning foam with significantly reduced smoke emissions when measured according to ASTM E-84. Such a foam has more than twice the compressive strength of a like foam prepared using the same amount by weight of a perchloroethylene glycol friability modifier. Similar results are obtained when a linear polyester such as polydiethylene adipate is employed.

In addition to significant increases in foam compressive strength and significant reduction of smoke emissions from ignited foam, the branched polyester also reduces cure times. This reduced cure time is a distinct advantage in, for example, a continuous process for preparing laminated foam board products. It is essential to obtain hardened, that is cured, foams as fast as possible when operating a high speed continuous foam producing apparatus in order to produce a foam that will not be damaged when sawed or cut to the desired shape or size. It has been observed that this advantageous result is obtained when branched polyesters are used in preparing the foam according to the present invention.

Obtaining a hardened foam product in an as fast as possible manner allows increased production and allows more economies of scale. This is a distinct commercial advantage.

Branched polyesters and polyesters with primary hydroxyl groups can be advantageously used. However, on a comparative basis, the cure time is longer than when branched polyesters are employed. It has been observed, however, that upon curing a foam having increased compressive strength with significantly reduced smoke emission is still obtained.

Without being limited thereby, it is believed that the friability modifiers may reduce the foam reaction rate sufficiently so as to enable the complete curing of the foam core as well as the outer foam areas remotely located from the core area. More specifically, polyester friability modifiers react with the resin and with the poly or diisocyanate during foam preparation. This increases the foam strength while concurrently reducing foam friability.

Polyester modifiers should be added as the last ingredient just before foaming to prevent the blowing agent from boiling off due to the heat liberated by the exothermic reaction of the polyester with either the resin or isocyanate.

Foams can be prepared using pre-blends or in one shot batches. However, separate pre-blending followed by mixing the pre-blends is preferred. Agitation is desirable in batch processes.

In either case, the foam product can be molded or obtained as a laminated product from, for example, a controllable continuous pressure conveyor process.

The invention is further illustrated in the following non-limiting examples showing different embodiments.

Unless otherwise specified, all parts and percentages are by weight. Melamine can either be fine or coarse powder.

EXAMPLE 1

A foam was molded from first and second pre-blends at room temperature using the following materials. A first pre-blend was prepared using:

| Phenolic resin | 100 parts |
| --- | --- |
| Melamine | 25 parts |
| Perchloroethylene | 20 parts |

A second pre-blend was prepared from:

| MDI | 150 parts |
| --- | --- |
| UL-22 catalyst | 1 part |
| Potassium octoate | 1 part |
| F-11 blowing agent | 25 parts |
| Silicone 197 surfactant | 2 parts |

The pre-blends were mixed and the foam was prepared (molded) at about 25° C. A molded foam product was obtained.

EXAMPLE 2

A foam was prepared as in Example 1 except polyethylene glycol was substituted for perchloroethylene. It was observed that this foam had about a 3% friability weight loss compared to about a 1.5% friability weight loss for the perchloroethylene modified foam.

EXAMPLE 3

A branched glycol adipate having a hydroxyl number of 51.5, an acid number of 1.3, only 0.02% water and a viscosity of about 22,000 cps at 25° C. was substituted for the perchloroethylene in Example 1. Friability weight loss was only about 0.5%.

EXAMPLE 4

A saturated hydroxyl terminated linear polyester having a molecular weight of about 2,000, a hydroxyl number of 56, an acid number of 0.8, only 0.5% water, a Gardner color of 1 and a viscosity of 8,000 cps at 25° C. was substituted for the perchloroethylene of Example 1. Friability weight loss was only about 0.5%.

The following table summarizes cure times and compressive strengths for products obtained according to Examples 1–4.

TABLE I

| Example | Cure Time | Compressive Strength | Density |
|---|---|---|---|
| 1 | 5 min. | 15 PSI | 2.0 pfc |
| 2 | 4 min. | 16 PSI | 2.0 pfc |
| 3 | 1 min. | 32 PSI | 2.0 pfc |
| 4 | 3 min. | 30 PSI | 2.0 pfc |

The foams from Examples 1–4 had K factors of about 0.12. The K factor represents BTU per inch per degree F per hour per square foot.

The foams were further evaluated according to ASTM E-84 procedures, the results of which are summarized in Table II.

TABLE II

| Example | Smoke | Flame Spread |
|---|---|---|
| 1 | 150 | 25 |
| 2 | 145 | 25 |
| 3 | 85 | 20 |
| 4 | 90 | 20 |

Using the polyester friability modifiers-agents resulted in a dramatic decrease in the quantity of smoke emitted when the subject foam was ignited according to ASTM E-84 procedures. Flame spread was also reduced. The compressive strength of the foams in Examples 3 and 4 was increased compared to the foams of Examples 1 and 2.

The examples and other descriptive material in the specification set forth various embodiments which are not intended to limit the scope of the invention. It would be understood that one skilled in the art will appreciate that various modifications and changes can be made without departing from the spirit of the claims for the present invention, which claims are to be given the broadest possible interpretation.

What is claimed is:

1. A foam composition obtained by (a) first forming a pre-blend reaction product by reacting about 200 to about 250 parts by weight melamine with about 20 to about 100 parts by weight phenolic resin having benzylic ether linkages in the presence of a catalyst and (b) further reacting said pre-blend reaction product with about 20 to about 100 parts by weight isocyanate and about 20 parts by weight polyethylene glycol in the presence of a blowing agent and surfactant.

2. A composition according to claim 1 wherein said friability modifier is perchloroethylene which is present in an amount between about 15 to about 25 parts by weight of said resin.

3. A foam composition according to claim 1 wherein said friability modifier is a hydroxyl terminated saturated branched polyester.

4. A composition according to claim 3 wherein said branched polyester is present in an amount between about 15 to about 25 parts by weight of said resin.

5. A composition according to claim 1, wherein said melamine is present in an amount of about 2 to about 25 parts by weight.

6. A foam composition according to claim 1, wherein said friability modifier is a hydroxyl terminated saturated linear polyester.

7. A foam composition according to claim 6 wherein said linear polyester used is in an amount between about 15 to about 25 parts by weight of said phenolic resin.

8. A foam composition obtained by first forming a pre-blend reaction product by (a) reacting about 2 to about 200 parts by weight melamine and about 20 to 100 parts by weight phenolic resin having benzylic ether linkages in the presence of a catalyst and (b) further reacting said pre-blend with about 20 to 100 parts by weight isocyanate and a friability modifier, said modifier being used in an amount of about 5 to about 35 parts by weight of said resin in the presence of a blowing agent and surfactant.

9. A foam composition obtained by reacting a pre-blend having about 150 to about 250 parts by weight melamine, about 100 parts by weight isocyanate, a blowing agent with about 20 parts by weight polyethylene glycol and about 20 to about 100 parts by weight phenolic resin having benzylic ether linkages in the presence of a trimerization catalyst and surfactant.

10. A foam composition according to claim 9 wherein said melamine is present from about 200 to about 250 parts by weight.

* * * * *